(12) United States Patent
Schwalbe (10) Patent No.: US 11,097,790 B2
(45) Date of Patent: Aug. 24, 2021

(54) APPARATUS AND METHOD FOR LENGTHENING A TRUCK CAB

(71) Applicant: Dennis Schwalbe, Muenster, TX (US)

(72) Inventor: Dennis Schwalbe, Muenster, TX (US)

(73) Assignee: Dennis Schwalbe, Muenster, TX (US)

( * ) Notice: Subject to any disclaimer, the term of this patent is extended or adjusted under 35 U.S.C. 154(b) by 0 days.

(21) Appl. No.: 16/865,102

(22) Filed: May 1, 2020

(65) Prior Publication Data
US 2020/0346697 A1    Nov. 5, 2020

Related U.S. Application Data (60) Provisional application No. 62/841,951, filed on May 2, 2019.

(51) Int. Cl.
| B62D 33/06 | (2006.01) |
| B62D 25/08 | (2006.01) |
| B62D 65/02 | (2006.01) |
| B62D 25/06 | (2006.01) |

(52) U.S. Cl.
CPC .............. *B62D 33/06* (2013.01); *B62D 25/06* (2013.01); *B62D 25/08* (2013.01); *B62D 33/0612* (2013.01); *B62D 65/02* (2013.01)

(58) Field of Classification Search
CPC ............................ B62D 33/06; B62D 33/0612
USPC ............... 296/190.01, 190.02, 190.08, 26.08
See application file for complete search history.

(56) References Cited

U.S. PATENT DOCUMENTS

| 3,485,522 | A | * | 12/1969 | Reinarts | ............... | B60P 3/423 |
| | | | | | | 296/26.08 |
| 4,775,179 | A | * | 10/1988 | Riggs | ............... | B62D 33/0612 |
| | | | | | | 296/180.2 |
| 4,887,859 | A | * | 12/1989 | Aper | ............... | B62D 47/006 |
| | | | | | | 296/26.08 |
| 5,310,239 | A | * | 5/1994 | Koske | ............... | B62D 33/0612 |
| | | | | | | 180/89.12 |
| D432,461 | S | | 10/2000 | Schwalbe | | |
| 6,276,748 | B1 | * | 8/2001 | Gobessi | ............... | B62D 29/001 |
| | | | | | | 296/190.02 |

\* cited by examiner

*Primary Examiner* — Dennis H Pedder
(74) *Attorney, Agent, or Firm* — Bracewell LLP (57) ABSTRACT

A method of extending a truck cab includes removing the cab rear panel, providing a cab rear opening with an upper margin and two side margins. An extender joins the truck cab, the extender having a forward opening with an upper margin and side margins that are recessed. A top fillet and two side fillets join the margins of the extender opening and have curvatures that match curvatures of top and side corners of the cab. The extender is placed against the truck cab with the extender opening margins in abutment with the cab opening margins. The fillets are in flush contact with the upper corner and side corners of the cab. Bolts secure the extender opening margins to the cab opening margins.

18 Claims, 6 Drawing Sheets

APPARATUS AND METHOD FOR LENGTHENING A TRUCK CAB

FIELD OF DISCLOSURE

The present disclosure relates to truck cab bodies, and in particular to a method and apparatus for extending a length of a truck cab body.

BACKGROUND

Truck cabs come in a variety of sizes. The driver compartments of some truck cabs as manufactured do not have integrated sleeper compartments and are not very long from the windshield to the back wall. A short truck cab can be uncomfortable to a driver spending many hours daily in the truck cab. A short length for the truck cab can limit an amount that a cab seat can be adjusted in a rearward direction.

It would be desirable to be able to modify an existing truck cab to be longer without changing the structural integrity of the truck cab. Also, it would be desirable to provide a final appearance for the extended truck cab such that it appears to be an original manufactured truck cab.

SUMMARY

A method of extending a truck cab by attaching an extender to the truck cab. The truck cab has a cab top and a cab rear panel joining each other at a cab upper corner. The truck cab has two cab sides, each joining the cab rear panel at a cab side corner. Each of the cab upper and side corners have curvatures. Technicians remove the cab rear panel, defining a cab rear opening with a cab opening upper margin on a lower edge of the cab upper corner and two cab opening side margins on each of the cab side corners.

The extender comprises an extender rear panel joining an extender top. Two extender sides join the extender top and the extender rear panel. A forward opening is on a forward side of the extender. The forward opening has an extender opening upper margin and two extender opening side margins. The extender opening upper and side margins are recessed relative to forward edges of the extender top and the extender sides. A top fillet extends between the extender opening upper margin and the forward edge of the extender top. The top fillet has a curvature that matches the curvature of the cab upper corner. The extender has two side fillets, each extending between the forward edge of one of the extender sides and one of the extender opening side margins. The side fillets have curvatures that match the curvatures of the cab side corners.

Technicians place the extender against the truck cab with the extender opening top margin and the extender opening side margins in abutment with the cab opening top margin and the cab opening side margins. The extender top fillet is in flush contact with the cab upper corner, and the extender side fillets in are in flush contact with the cab side corners. The technicians secure the extender opening top margin and the extender opening side margins to the cab opening top margin and the cab opening side margins.

An adhesive may be placed between the extender top fillet and the cab upper corner and an adhesive between the extender side fillets and each of the cab side corners.

In one embodiment, the extender opening top margin and the extender opening side margins are bolted to the cab opening top margin and the cab opening side margins, respectively. The cab opening top margin and the cab opening side margins may be flat. The extender opening top margin and the extender opening side margins may be flat.

In the embodiment shown, the extender top fillet has a greater radius than each of the extender side fillets.

While the disclosure will be described in connection with the preferred embodiments, it will be understood that it is not intended to limit the disclosure to that embodiment. On the contrary, it is intended to cover all alternatives, modifications, and equivalents, as may be included within the scope of the claims.

DETAILED DESCRIPTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
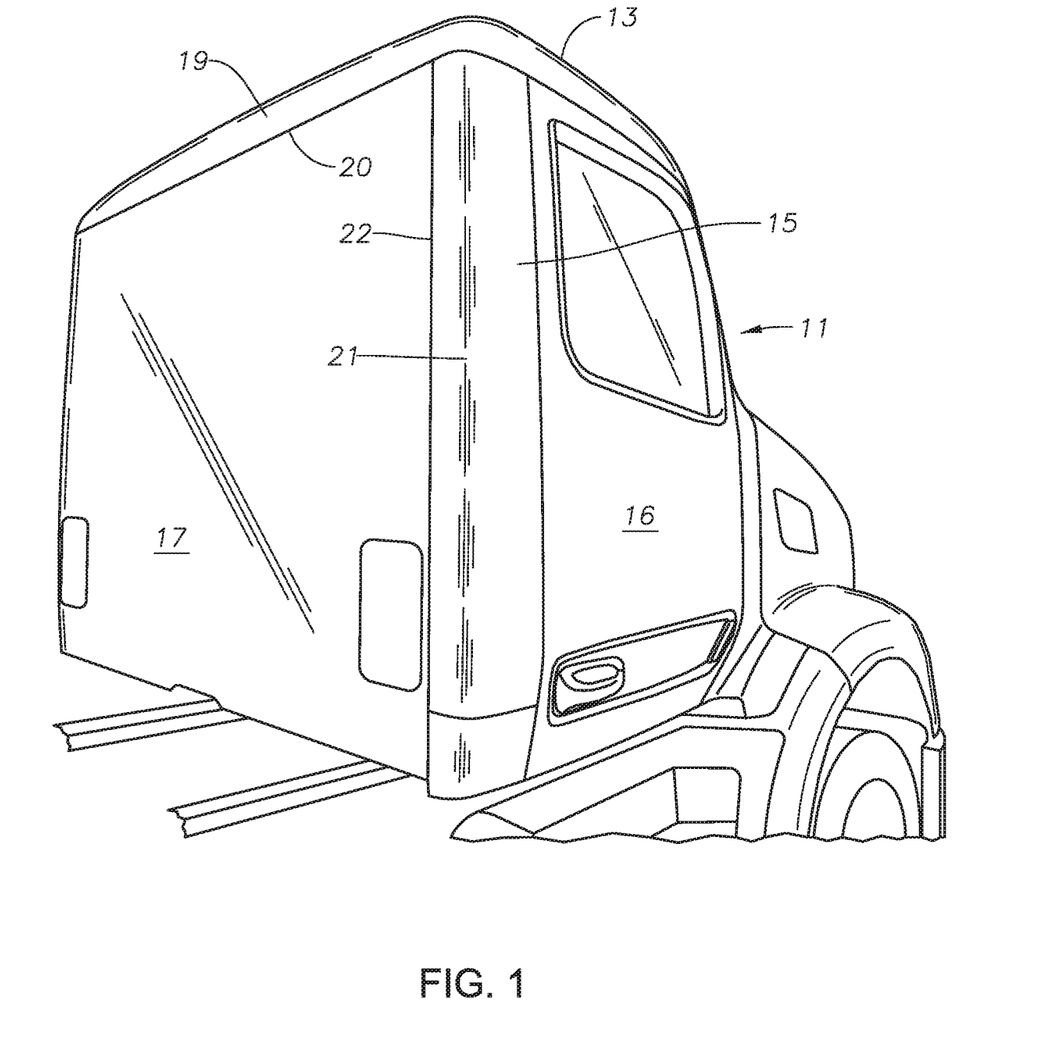
FIG. 1 is a perspective view of a truck cab before beginning the process of extending the cab.

FIG. 1 illustrates one example of a truck cab 11 as manufactured and prior to undergoing an extension process in accordance with this disclosure. There are numerous shapes and sizes for truck cab 11. Truck cab 11 has a body with a roof or top 13 and two sides 15, each of which may include a door 16. A flat, vertical rear panel 17 joins the top 13 at a cab upper corner 19. Upper corner 19 is curved and has a horizontal portion joining top 13 and a vertical portion that joins rear panel 17. Vertically extending cab side corners 21 join side edges of cab rear panel 17 to cab sides 15. Cab side corners 21 are also rounded.

In this example, cab top 13, sides 15, and upper and side corners 19, 21 are formed of a composite material, such as fiberglass. Rear panel 17 is formed of a metal such as aluminum. The materials can vary. An upper seam 20 separates the upper edge of rear panel 17 from cab upper corner 19, and side seams 22 separate the side edges of rear panel 17 from cab side corners 21.

Figure 2:
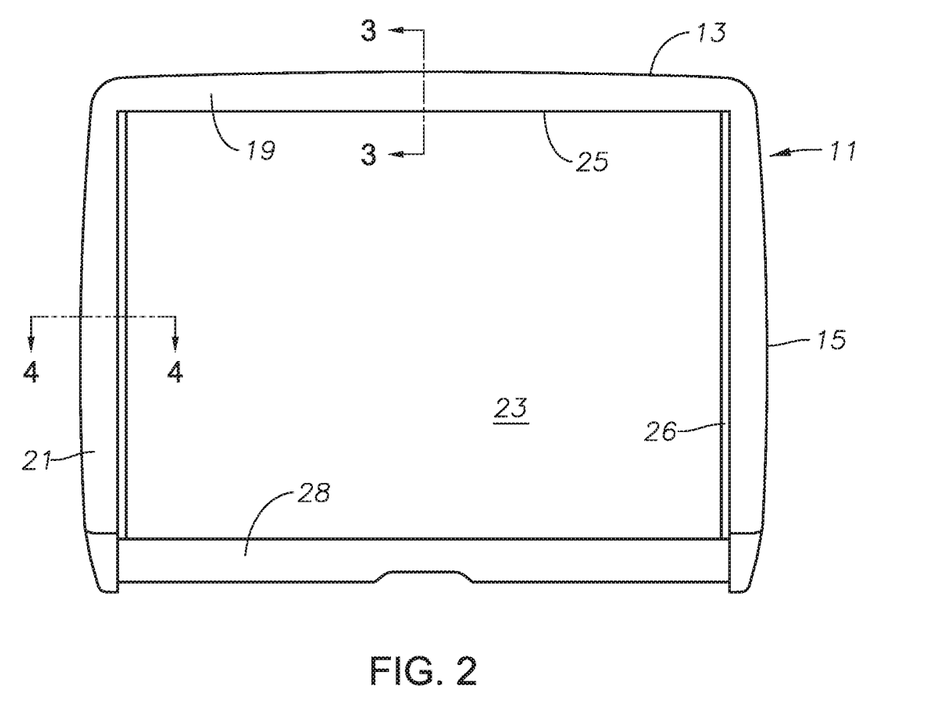
FIG. 2 is a perspective view of a rear portion of the truck cab of FIG. 1 after removing the manufacturer's rear panel.

Referring to FIG. 2, a first step comprises cutting, removing and discarding rear panel 17 (FIG. 1) from truck cab 11. The removal of rear panel 17 creates a rear opening 23 that is generally rectangular. Cab rear opening 23 has a top edge, boundary, or margin 25 at the lower edge of upper corner 19 and two side margins 26 at inner edges of cab side corners 21. Top margin 25 and side margins 26 are flat portions that frame the top and side of cab rea opening 23. Cab top margin 25 extends from one side margin 26 to the other and is generally horizontal. Side margins 26 extend generally vertically from top margin 25 to a cab floor 28.

Figure 3:
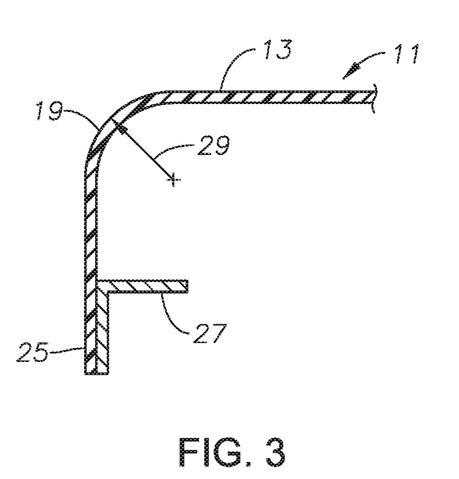
FIG. 3 is sectional view of a portion of the truck cab, taken along the line 3-3 of FIG. 2.

As shown in FIG. 3, top margin 25 is a generally flat portion on the lower edge of cab upper corner 19. In this example, truck cab 11 has on the interior side of upper corner 19 a steel angle member 27 that forms part of the reinforcing structure (not shown) for truck cab 11. Upper margin 25 abuts angle member 27. The lower edge of upper margin 25 may be flush with the lower edge of angle member 27. Cab upper corner 19 is rounded between its upper side and rearward side with a curvature having a radius 29.

Figure 4:
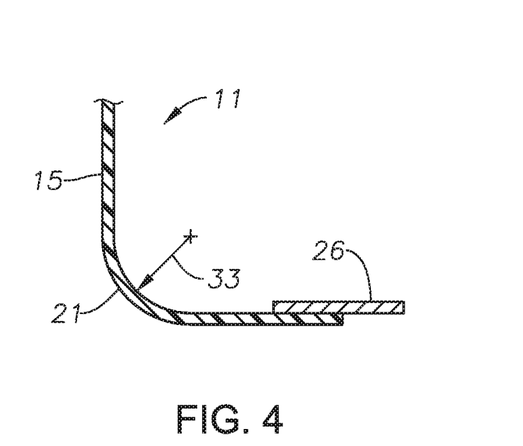
FIG. 4 is a sectional view of a portion of the truck cab, taken along the line 4-4 of FIG. 2.

FIG. 4 shows one of the cab side corners 21 in a horizontal section plane, the other side corner 21 being the same. In this particular truck cab 11, cab side margin 26 is a flat metal strip that originally was used to secure rear panel 17 (FIG. 1) to side corners 21 by rivets. While removing rear panel 17, the rivets will be ground off. Each side margin 26 extends from cab top margin 25 to floor 28 (FIG. 2) and may be secured to reinforcing structure in truck cab 11. An interior side of side corner 21 may be bonded to a rearward facing side of cab side margin 26. Each cab side corner 21 is rounded between its outward lateral facing side and its rearward facing side at a radius 33. In this embodiment, radius 33 is smaller than radius 29 (FIG. 3), but the relative size may vary.

Figure 5:
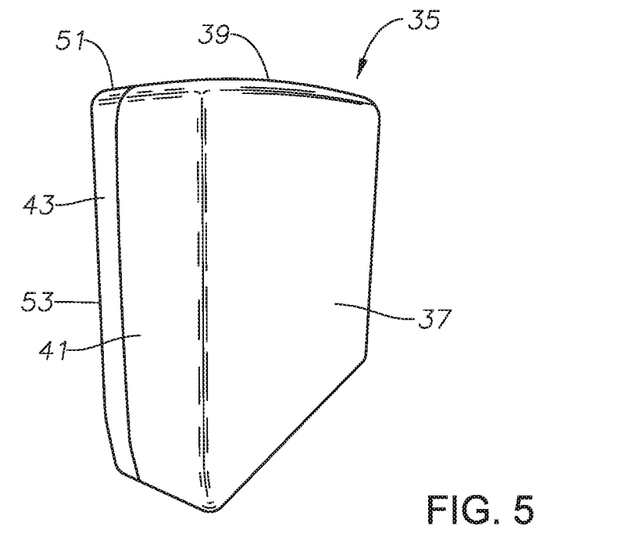
FIG. 5 is a perspective view from the rear of a truck cab extender, prior to installation on the truck cab of FIG. 1.

Referring to FIG. 5, an extender 35 will be secured to truck cab 11 after removing rear panel 17 (FIG. 1) to lengthen truck cab 11. Extender 35 may be formed entirely of a composite material, such as fiberglass. Extender 35 is generally rectangular, having a rear panel 37 that is in a vertical plane. Extender 35 has a top 39 and two sides 41 that join extender rear panel 37. The corners between extender top 39 and each extender side 41 and between extender top 39 and extender rear panel 37 are rounded to match the contour of truck cab 11 (FIG. 1). Extender sides 41 taper toward each other in a downward direction to match the contour of cab sides 15 (FIG. 2). Also, the corners between sides 41 and rear panel 37 are rounded. Extender 35 may have a ring, bezel or flange 43 on its forward side that is integrally joined to extender 35 after each have been separately molded. Flange 43 extends the full length of each extender side 41 and the full width of extender top 39.

Figure 6:
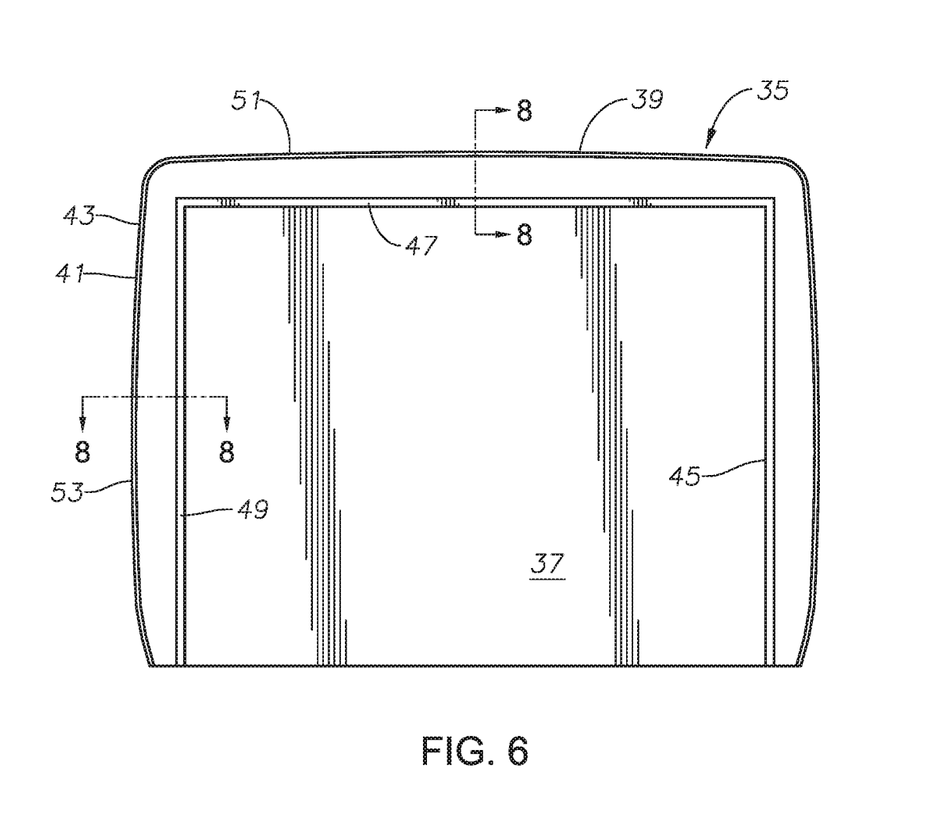
FIG. 6 is a front view of the truck cab extender of FIG. 5.

Referring to FIG. 6, extender 35 has a forward opening 45 that is bounded by an extender upper margin 47 and two extender side margins 49. Extender upper and side margins 47, 49 are flat portions formed on flange 43 and are substantially in a single vertical plane. Extender upper and side margins 47, 49 frame the upper and sides of forward opening 45.

Flange 43, which forms a forward portion of extender top 39, has a forward upper edge 51 that is above and forward of extender upper margin 47. Flange 43, which also forms a forward portion of each extender side 41, has forward sides edges 53, each of which is laterally outward from and generally parallel with extender side margins 49. Each forward side edge 53 is forward from extender side margins 49. The forward side of extender rear panel 37 is rearward from extender forward opening 45 and visible in FIG. 6. The lower side or bottom of extender 35 is open in this embodiment. Forward opening 45 is recessed in a rearward direction from forward upper edge 51 and forward side edges 53.

Figure 7:
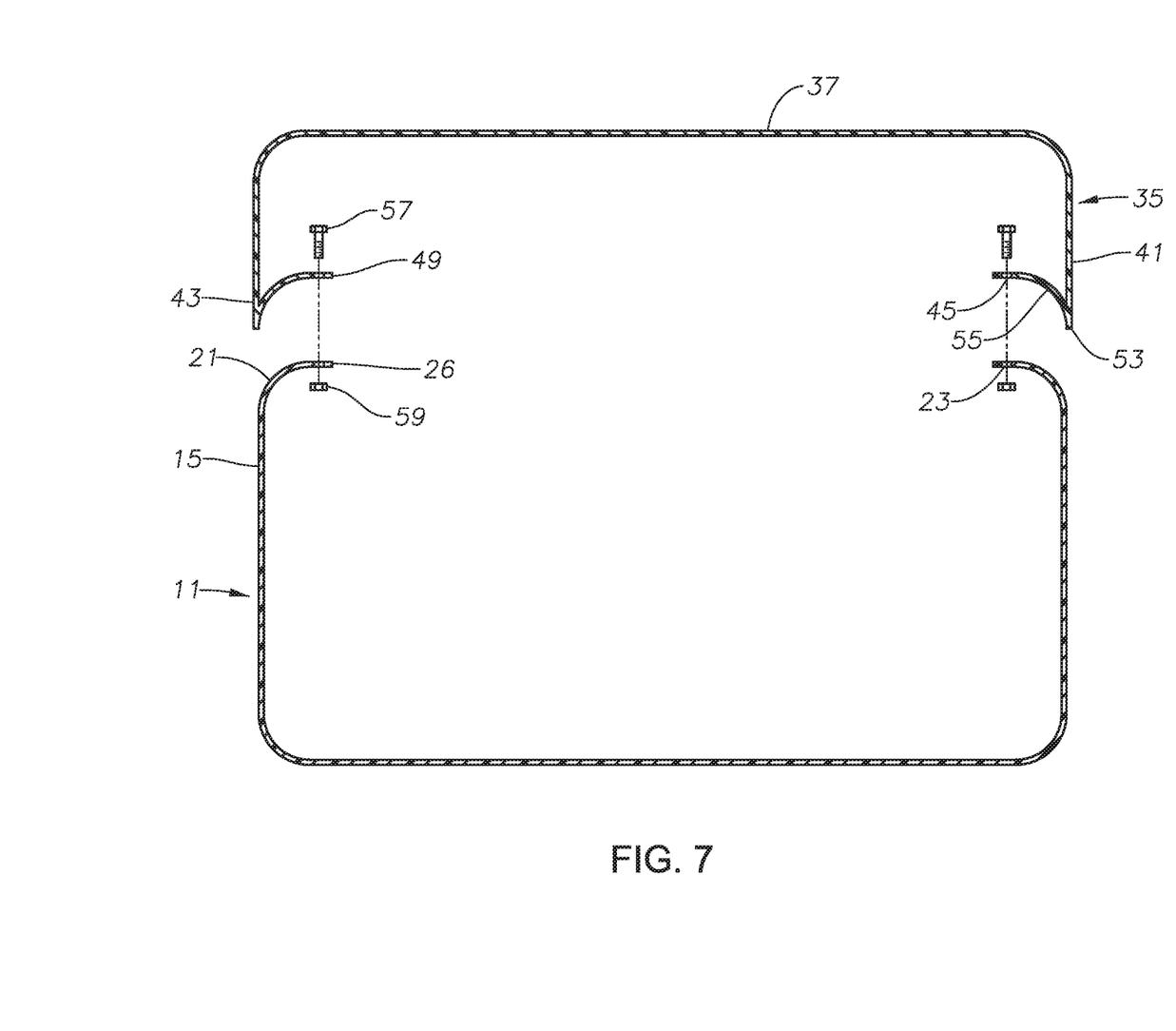
FIG. 7 is a top, schematic exploded view showing the truck cab extender being mounted to the truck cab of FIG. 1.

Referring to FIG. 7, extender flange 43 has side fillets 55 that extend from each forward side edge 53 to each extender side margin 49. Each side fillet 55 is a concave, curved surface with a radius that matches radius 33 (FIG. 4) of each cab side corner 21. During assembly, extender 35 will be moved forward from the position in FIG. 7 until extender side fillets 55 are in flush contact with cab side corners 21. In the flush contact position, extender side margins 49 will be in flush abutment with cab side margins 26. An adhesive layer may be placed between the mating surfaces of extender side fillets 55 and cab side corners 21 to seal out moisture. Then bolts 57 will be inserted through drilled holes in extender side margins 49 and cab side margins 26. Nuts 59 will engage bolts 57 to tightly secure extender side fillets 55 to cab side corners 21.

Figure 8:
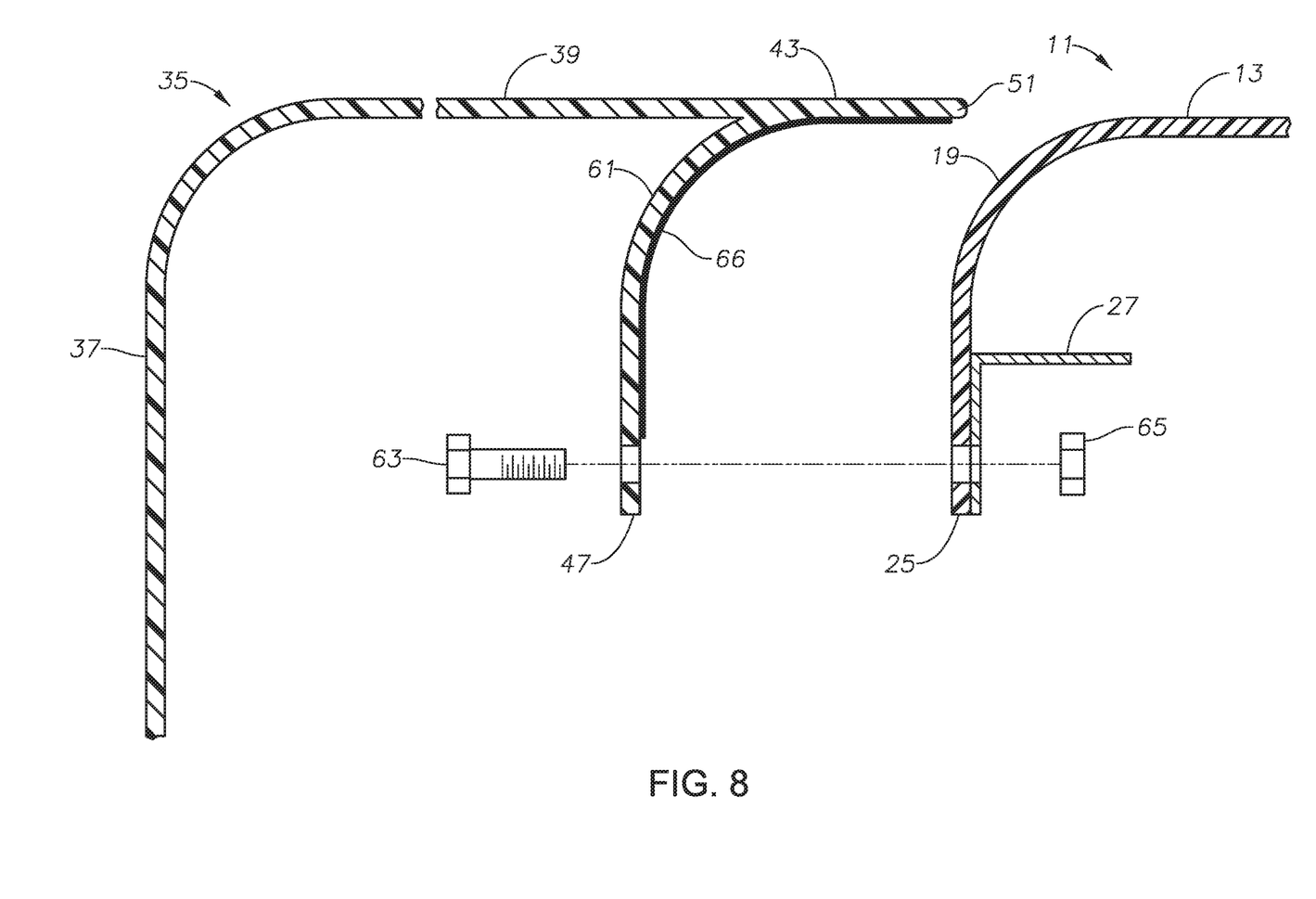
FIG. 8 is a vertical cross-sectional schematic view of the truck cab extender taken along the line 8-8 of FIG. 6 and showing the truck cab extender in exploded form being mounted to the truck cab of FIG. 1.

Referring to FIG. 8, an upper fillet 61 extends in a concave manner between extender forward upper edge 51 and extender upper margin 47. Upper fillet 61 has the same radius as radius 29 (FIG. 3) of cab upper corner 19. When extender 35 is moved forward to the abutting position during assembly, extender upper fillet 61 will be in abutting, flush contact with cab upper corner 19. Extender upper margin 47 will be in flush abutment with cab top margin 25. Holes will be drilled through extender upper margin 47, cab top margin 25 and angle member 27. Bolts 63 will be inserted through the holes and secured by nuts 65. An adhesive layer 66 may also be employed between fillet 61 and its abutting surfaces to keep out moisture.

Figure 9:
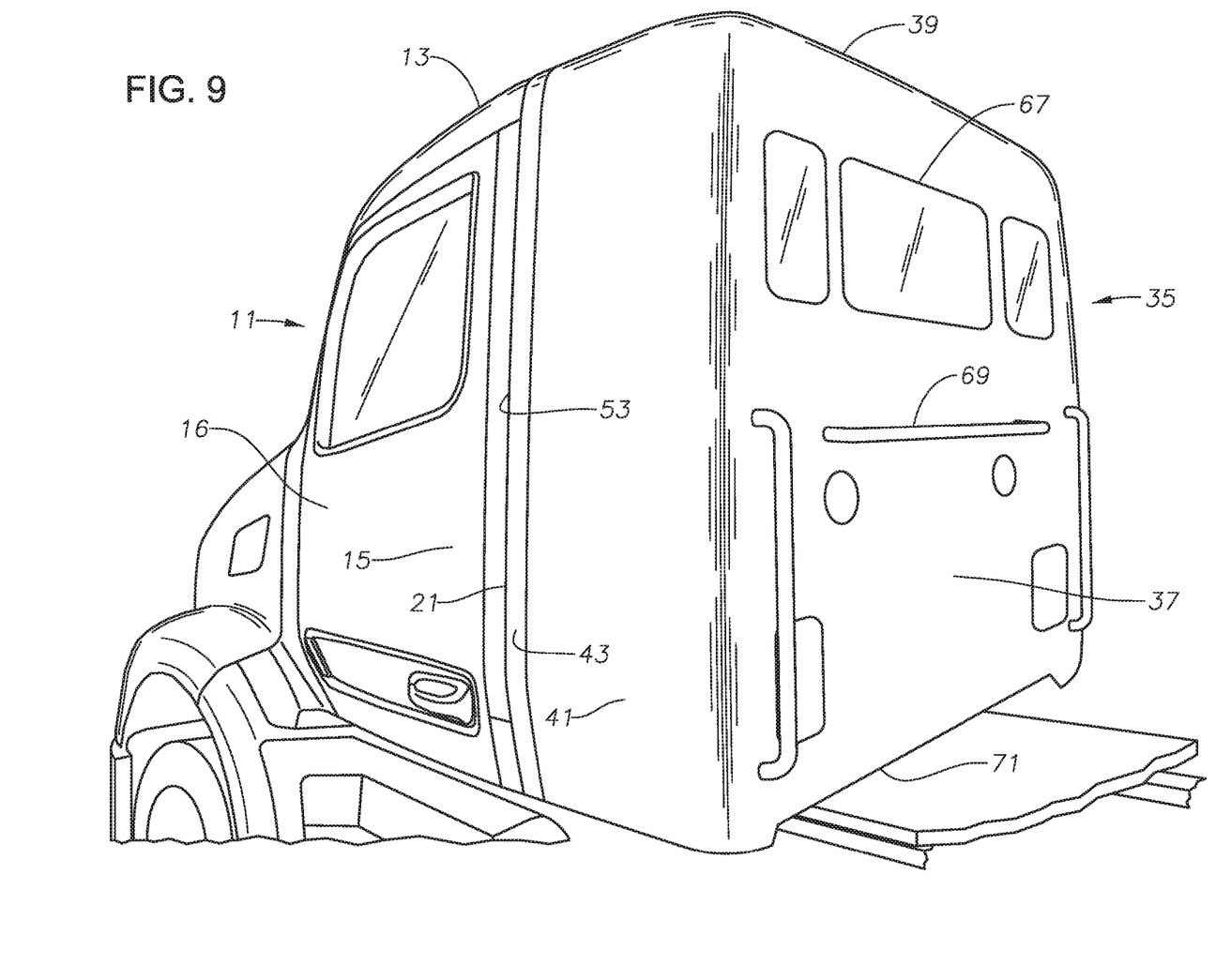
FIG. 9 is a perspective view of the truck cab of FIG. 1 with the truck cab extender installed.

FIG. 9 shows extender 35 in the installed position. Windows 67 and handles 69 optionally may be installed on and in extender rear panel 37. The cab floor (not shown) will be lengthened to provide a floor for extender 35. A notch 71 may be cut in the lower edge of extender rear panel 37 to accommodate truck structure extending rearward from extender 35. Extender flange 43 matches the contour of cab top 13 and cab sides 15. Fiberglass work between the forward edges of extender flange 43 and cab upper corner 19 (FIG. 8) and cab side corners 21 is not needed.

The present disclosure described herein, therefore, is well adapted to carry out the objects and attain the ends and advantages mentioned, as well as others inherent therein. While one embodiment of the disclosure has been given for purposes of disclosure, numerous changes exist in the details of procedures for accomplishing the desired results. These and other similar modifications will readily suggest themselves to those skilled in the art, and are intended to be encompassed within the scope of the appended claims.

The invention claimed is:

1. A method of extending a truck cab having a cab top and a cab rear panel joining each other at a cab upper corner, the truck cab further having two cab sides, each joining the cab rear panel at a cab side corner, each of the cab upper and cab side corners having curvatures, the method comprising:

removing the cab rear panel, defining a cab rear opening with a cab opening upper margin on a lower edge of the cab upper corner and two cab opening side margins on each of the cab side corners;

joining an extender to the truck cab, the extender comprising:

an extender rear panel joining an extender top;

two extender sides joining the extender top and the extender rear panel;

a forward opening on a forward side of the extender, the forward opening having an extender opening upper margin and two extender opening side margins, the extender opening upper and side margins being recessed relative to forward edges of the extender top and the extender sides;

a top fillet extending between the extender opening upper margin and the forward edge of the extender top, the top fillet having a curvature that matches the curvature of the cab upper corner;

two side fillets, each extending between the forward edge of one of the extender sides and one of the extender opening side margins, the side fillets having curvatures that match the curvatures of the cab side corners;

wherein joining the extender to the truck cab comprises:

placing the extender against the truck cab with the extender opening upper margin and the extender opening side margins in abutment with the cab opening upper margin and the cab opening side margins, respectfully, with the extender top fillet in flush contact with the cab upper corner, and with the extender side fillets in flush contact with the cab side corners; then securing the extender opening upper margin and the extender opening side margins to the cab opening upper margin and the cab opening side margins, respectfully.

2. The method according to claim 1, further comprising placing an adhesive between the extender top fillet and the cab upper corner and an adhesive between the extender side fillets and each of the cab side corners.

3. The method according to claim 1, wherein:

securing the extender opening upper margin and the extender opening side margins comprises bolting the extender opening upper margin and the extender opening side margins to the cab opening top margin and the cab opening side margins, respectively.

4. The method according to claim 1, wherein:

the cab opening upper margin and the cab opening side margins are flat; and the extender opening upper margin and the extender opening side margins are flat.

5. The method according to claim 1, wherein:

the extender top fillet has a greater radius than each of the extender side fillets.

6. An extender for securing to a truck cab to lengthen the truck cab, comprising:

an extender rear panel, an extender top, and two extender sides;

a forward opening on a forward sides of the extender rear panel that has an extender opening upper margin and two extender opening side margins, the extender opening upper and side margins being recessed rearward relative to forward edges of the extender top and the extender sides;

a top fillet extending between the extender opening upper margin and the forward edge of the extender top for mating with a rounded upper corner of the truck cab; and two side fillets, each extending between the forward edge of one of the extender side and one of the extender opening side margins for mating with rounded side corners of the truck cab.

7. The extender according to claim 6, wherein:

the extender opening upper and side margins comprise flat portions of the extender that frame upper and side edges of the extender opening.

8. The extender according to claim 6, wherein the flat portions are located in a single plane.

9. The extender according to claim 7, further comprising bolt holes in the flat portions for securing the extender to the truck cab.

10. The extender according to claim 6, wherein:

the extender top fillet has a greater radius than each of the extender side fillets.

11. A truck cab, comprising:

a cab top and a cab rear panel joining each other at a cab upper corner, and two cab sides, each joining the cab rear panel at a cab side corner, each of the cab upper and cab side corners having curvatures;

a cab rear opening with a cab opening upper margin on a lower edge of the cab upper corner and two cab opening side margins on each of the cab side corners;

an extender having an extender rear panel joining an extender top;

two extender sides joining the extender top and the extender rear panel;

a forward opening on a forward side of the extender, the forward opening having an extender opening upper margin and two extender opening side margins, the extender opening upper and side margins being recessed relative to forward edges of the extender top and the extender sides;

a top fillet extending between the extender opening upper margin and the forward edge of the extender top, the top fillet having a curvature that matches the curvature of the cab upper corner;

two side fillets, each extending between the forward edge of one of the extender sides and one of the extender opening side margins, the side fillets having curvatures that match the curvatures of the cab side corners;

the extender opening upper margin and the extender opening side margins being in abutment with the cab opening upper margin and the cab opening side margins, respectfully, the extender top fillet being in flush contact with the cab upper corner, and the extender side fillets being in flush contact with the cab side corners; and the extender opening upper margin and the extender opening side margins being secured to the cab opening upper margin and the cab opening side margins, respectfully.

12. The truck cab according to claim 11, further comprising an adhesive layer between the extender top fillet and the cab upper corner and an adhesive layer between the extender side fillets and each of the cab side corners.

13. The truck cab according to claim 11, further comprising:

bolts that secure the extender opening upper margin and the extender opening side margins to the cab opening upper margin and the cab opening side margins, respectively.

14. The truck cab according to claim 11, wherein:

the cab opening upper margin and the cab opening side margins are flat; and the extender opening upper margin and the extender opening side margins are flat and in flush contact with the cab opening top margin and the cab opening side margins, respectively.

15. The truck cab according to claim 11, wherein:
the cab opening upper and side margins comprise flat portions of the truck cab that frame upper and side edges of the cab opening, respectively.

16. The truck cab according to claim 15, wherein:
the extender opening upper and side margins comprise flat portions of the extender that frame upper and side edges of the extender opening, respectively.

17. The extender according to claim 16, wherein:
the truck cab opening upper and side margins are located in a single plane; and
the extender opening upper and side margins are located in a single plane.

18. The extender according to claim 11, wherein:
the extender top fillet has a greater radius than each of the extender side fillets.

* * * * *